US 11,491,433 B2

(12) United States Patent
Takano et al.

(10) Patent No.: US 11,491,433 B2
(45) Date of Patent: Nov. 8, 2022

(54) BACKPACK DUST COLLECTOR

(71) Applicant: MAKITA CORPORATION, Anjo (JP)

(72) Inventors: Hideaki Takano, Anjo (JP); Makoto Hotta, Anjo (JP); Takayuki Tahara, Anjo (JP)

(73) Assignee: MAKITA CORPORATION, Anjo (JP)

( * ) Notice: Subject to any disclaimer, the term of this patent is extended or adjusted under 35 U.S.C. 154(b) by 149 days.

(21) Appl. No.: 16/806,153

(22) Filed: Mar. 2, 2020

(65) Prior Publication Data

US 2020/0282353 A1 Sep. 10, 2020

(30) Foreign Application Priority Data

Mar. 5, 2019 (JP) .............................. JP2019-039646

(51) Int. Cl.
*B01D 46/42* (2006.01)
*B01D 46/02* (2006.01)

(52) U.S. Cl.
CPC ......... *B01D 46/4236* (2013.01); *B01D 46/02* (2013.01); *B01D 2279/55* (2013.01)

(58) Field of Classification Search
CPC ............................ B01D 46/4236; B01D 46/02; B01D 2279/55; A47L 5/38; A47L 9/0081; A47L 5/36
USPC .............................. 96/382; 15/326, 314, 413
See application file for complete search history.

(56) References Cited

U.S. PATENT DOCUMENTS

| | | | |
|---|---|---|---|
| 5,991,969 A * | 11/1999 | Lee ........................ | A47L 9/0081 15/326 |
| 6,052,863 A * | 4/2000 | Rittmueller ............... | A47L 9/02 |
| 6,305,048 B1 * | 10/2001 | Salisian .................. | A47L 9/322 15/326 |

(Continued)

FOREIGN PATENT DOCUMENTS

| CN | 1187335 A | 7/1998 |
|---|---|---|
| CN | 1833593 A | 9/2006 |

(Continued)

OTHER PUBLICATIONS

Feb. 8, 2022 Office Action issued in Chinese Patent Application No. 202010020315.8.

(Continued)

*Primary Examiner* — Robert A Hopkins
*Assistant Examiner* — Qianping He
(74) *Attorney, Agent, or Firm* — Oliff PLC

(57) ABSTRACT

A backpack dust collector includes a housing, a slit portion, and a noise-absorbing member. The housing includes a suction port, a dust collecting chamber, a motor chamber, and an exhaust port. The dust collecting chamber is connected to the suction port and configured to accommodate a dust collecting bag. The motor chamber is connected to the dust collecting chamber and accommodates a fan and a motor. Through the exhaust port, air from the motor chamber is discharged. The slit portion is disposed in a flow path between the motor chamber and the exhaust port and includes at least one slit-shaped vent through which air from the motor chamber passes. The noise-absorbing member is disposed in at least part of a flow path between the vent and the exhaust port.

18 Claims, 15 Drawing Sheets

(56) References Cited

U.S. PATENT DOCUMENTS

| | | | | |
|---|---|---|---|---|
| 2014/0237766 A1* | 8/2014 | Conrad | ............... | A47L 9/1666 |
| | | | | 15/353 |
| 2015/0020345 A1* | 1/2015 | Day | ..................... | A47L 9/22 |
| | | | | 15/347 |
| 2017/0007085 A1* | 1/2017 | Tahara | ................. | A47L 9/24 |
| 2018/0020891 A1* | 1/2018 | Kim | ................... | A47L 9/1683 |
| | | | | 15/326 |

FOREIGN PATENT DOCUMENTS

| | | | |
|---|---|---|---|
| CN | 103371778 | A | 10/2013 |
| CN | 203841612 | U | 9/2014 |
| CN | 204192510 | U | 3/2015 |
| CN | 106333628 | A | 1/2017 |
| JP | S60-188559 | U | 12/1985 |
| JP | H07-327870 | A | 12/1995 |
| JP | H10-234627 | A | 9/1998 |
| JP | 2017-018567 | A | 1/2017 |

OTHER PUBLICATIONS

Jun. 15, 2022 Office Action issued in Chinese Patent Application No. 202010020315.8.
Aug. 16, 2022 Office Action issued in Japanese Patent Application No. 2019-039646.

* cited by examiner

BACKPACK DUST COLLECTOR

CROSS-REFERENCE TO RELATED APPLICATION(S)

The present application claims priority to and incorporates by reference the entire contents of Japanese Patent Application No. 2019-039646 filed in Japan on Mar. 5, 2019.

BACKGROUND OF THE INVENTION

1. Field of the Invention

The present invention relates to a backpack dust collector.

2. Description of the Related Art

A backpack dust collector includes a fan and a motor configured to generate motive power for rotating the fan. By rotating the fan, air is suctioned with dust through a suction port of the backpack dust collector. The air suctioned through the suction port flows through an internal space of the backpack dust collector, and is then discharged from an exhaust port. An example of related art is described in JP-A-2017-018567.

Noise generated from the backpack dust collector causes a user of the backpack dust collector to feel discomfort.

An object of an aspect of the present invention is to suppress generation of noise.

SUMMARY OF THE INVENTION

According an aspect of the present invention, a backpack dust collector includes a housing, a slit portion, and a noise-absorbing member. The housing includes a suction port, a dust collecting chamber, a motor chamber, and an exhaust port. The dust collecting chamber is connected to the suction port and configured to accommodate a dust collecting bag. The motor chamber is connected to the dust collecting chamber and accommodates a fan and a motor. Through the exhaust port, air from the motor chamber is discharged. The slit portion is disposed in a flow path between the motor chamber and the exhaust port and includes at least one slit-shaped vent through which air from the motor chamber passes. The noise-absorbing member is disposed in at least part of a flow path between the vent and the exhaust port.

DETAILED DESCRIPTION OF THE PREFERRED EMBODIMENTS

Embodiments of the present invention will now be described with reference to the drawings. However, the present invention is not limited to these embodiments. Components according to the respective embodiments may be combined appropriately. Some components may be omitted.

In the following description, the terms "left", "right", "front", "rear", "up", and "down" are used to describe positional relations of the respective components. These terms indicate relative positions or directions with respect to an operator WM.

First Embodiment

Figure 1:
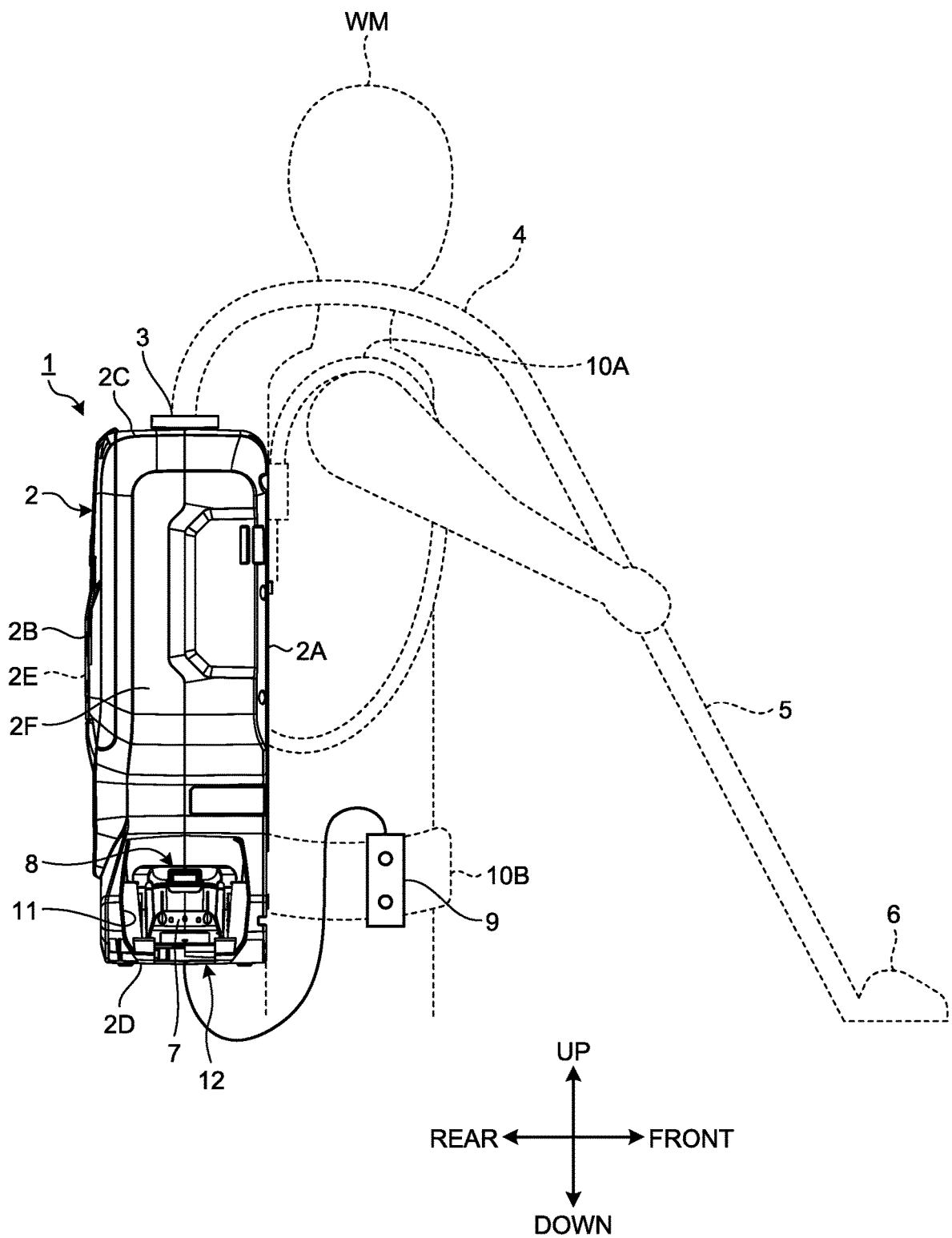
FIG. 1 is a side view of a backpack dust collector according to a first embodiment.

FIG. 1 is a side view of a backpack dust collector 1 according to the present embodiment. As illustrated in FIG. 1, the backpack dust collector 1 is used while being carried on an operator WM's back. The backpack dust collector 1 includes a housing 2, a hose 4 connected to a suction port 3 of the housing 2, a pipe 5 connected to the hose 4, a nozzle 6 connected to the pipe 5, one or more battery mounting portions 8 on each of which a general-purpose battery 7 is mounted, and an operation unit 9.

The general-purpose battery 7 can be used as a power supply for electrical machinery and apparatus of various types. The general-purpose battery 7 can be used as a power supply for a power tool. The general-purpose battery 7 can be used also as a power supply for electric machinery and apparatus other than the power tool. The general-purpose battery 7 can be used also as a power supply for a dust collector other than the backpack dust collector 1 according to the present embodiment. In the following description, the general-purpose battery 7 is called "battery 7" as appropriate.

The housing 2 is carried on the operator WM's back. The housing 2 is attached to the operator WM's back with shoulder belts 10A and a waist belt 10B. The shoulder belts 10A are attached to the operator WM's shoulders. The waist belt 10B is attached to the operator WM's waist.

The housing 2 has an internal space. The housing 2 has a front surface 2A facing forward, a rear surface 2B facing rearward, an upper surface 2C facing upward, a lower surface 2D facing downward, a left side surface 2E facing leftward, and a right side surface 2F facing rightward. In a state in which the housing 2 is carried on the operator WM's back, the front surface 2A of the housing 2 faces the operator WM's back.

The suction port 3 is disposed in an upper portion of the housing 2. The hose 4 is flexible. One end portion of the hose 4 is connected to the suction port 3. The other end portion of the hose 4 is connected to one end portion of the pipe 5. The nozzle 6 is connected to the other end portion of the pipe 5. The nozzle 6 has a suction opening.

The housing 2 includes battery openings 11 through which the corresponding batteries 7 can pass and battery receiving portions 12 respectively connected to the battery openings 11. Each battery 7 is received by the corresponding battery receiving portion 12. Each battery opening 11 is formed at a lower portion of the housing 2. Each battery mounting portion 8 is arranged in the corresponding battery receiving portion 12.

The operation unit 9 is operated by the operator WM. The operation unit 9 includes a switch for starting up the backpack dust collector 1. The operation unit 9 is attachable to the waist belt 10B.

Figure 2:
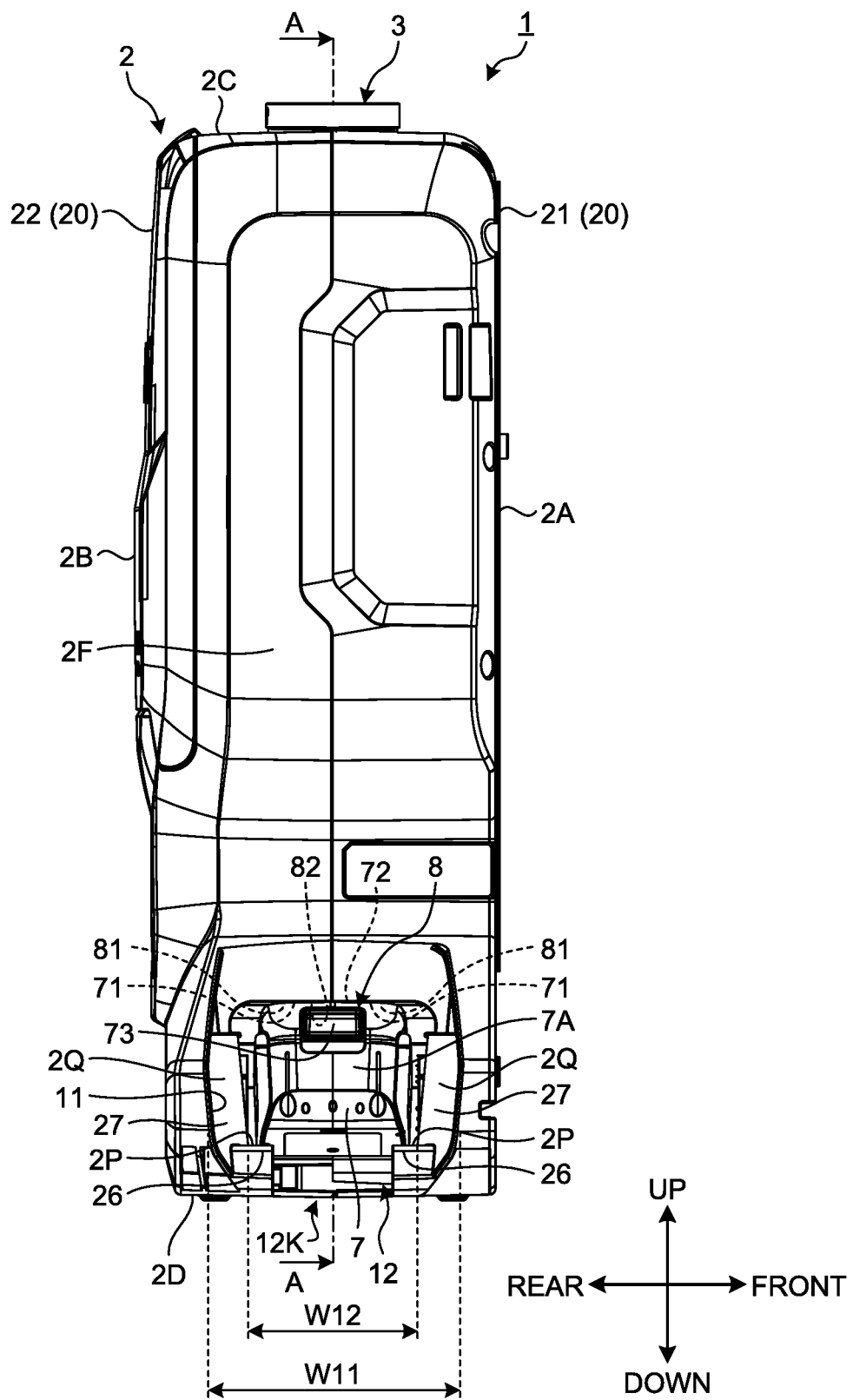
FIG. 2 is a side view of the backpack dust collector according to the first embodiment.
Figure 3:
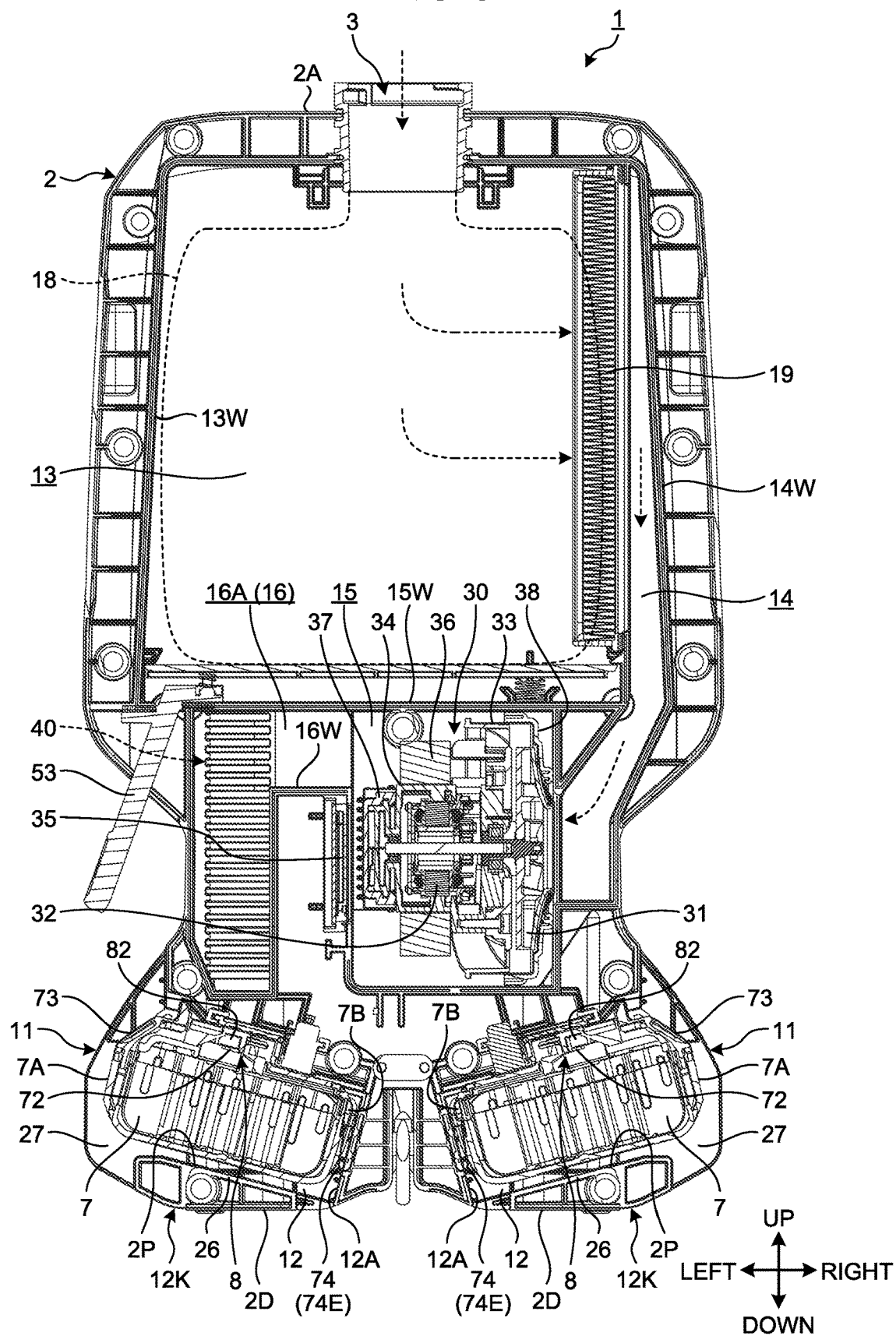
FIG. 3 is a sectional view of the backpack dust collector according to the first embodiment.
Figure 4:
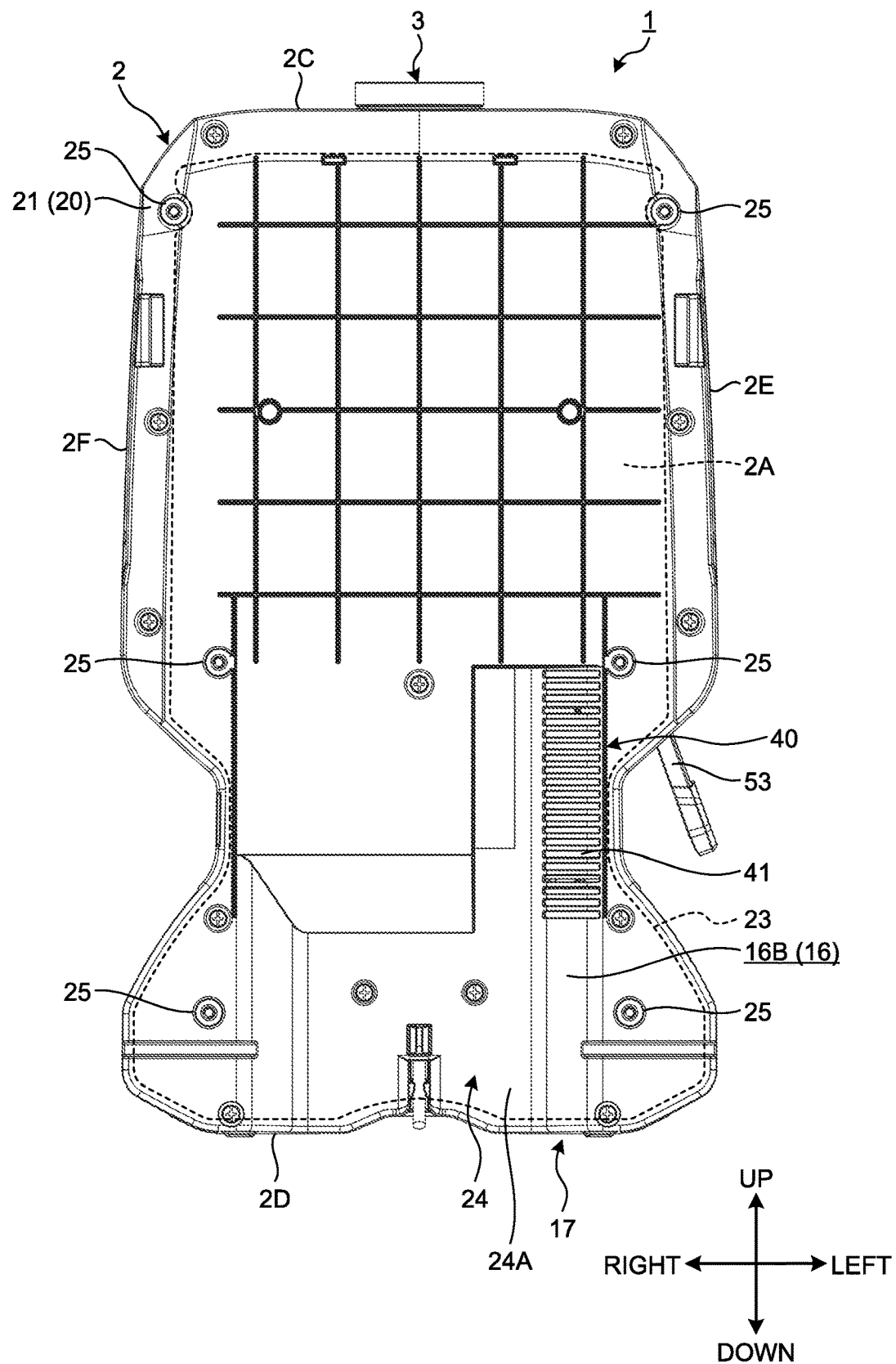
FIG. 4 is a front view of the backpack dust collector according to the first embodiment.
Figure 5:
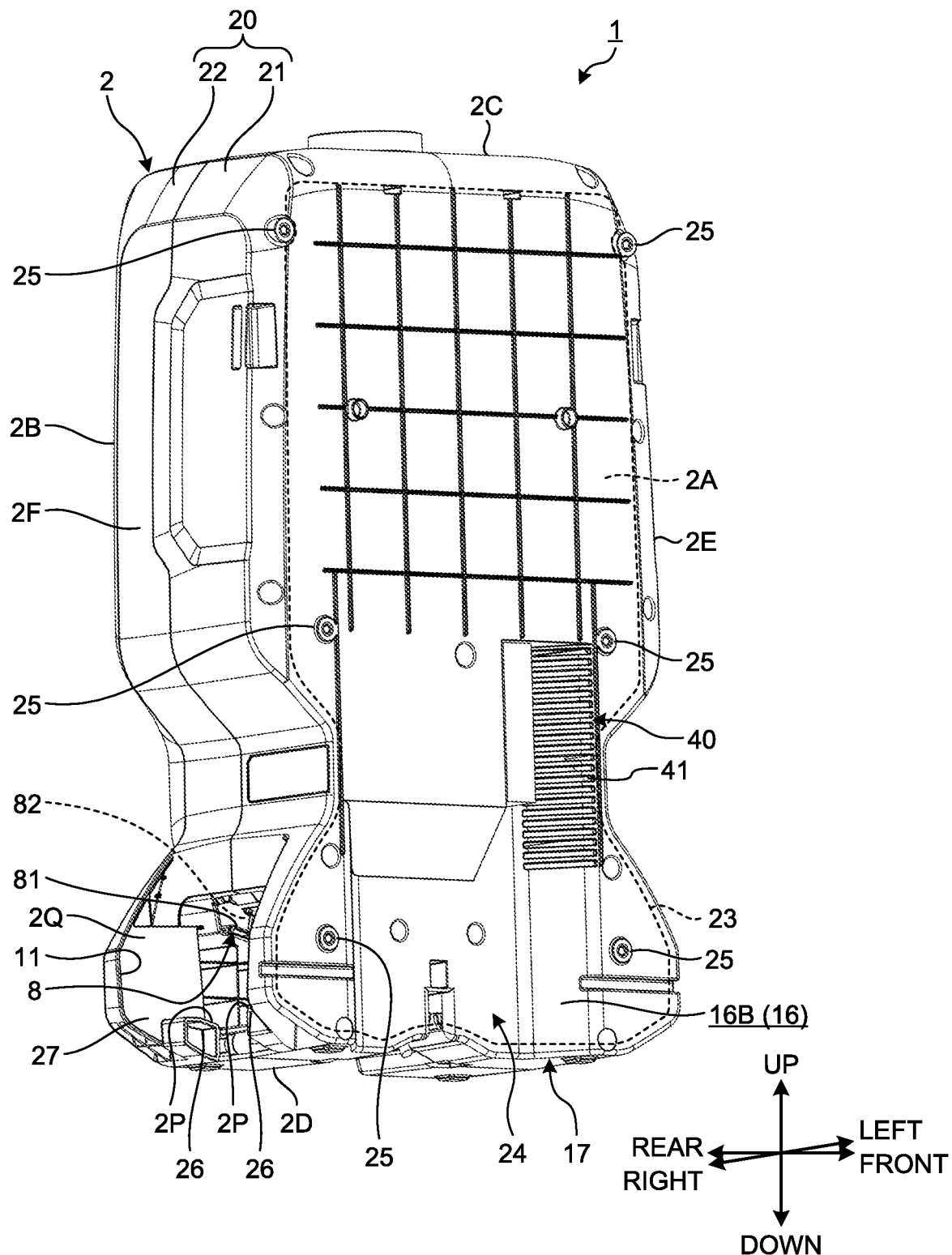
FIG. 5 is a perspective view of the backpack dust collector according to the first embodiment.

FIG. 2 is a side view of the backpack dust collector 1 according to the present embodiment. FIG. 3 is a sectional view of the backpack dust collector 1 according to the present embodiment taken along line A-A in FIG. 2. FIG. 4 is a front view of the backpack dust collector 1 according to the present embodiment. FIG. 5 is a perspective view of the backpack dust collector 1 according to the present embodiment.

The housing 2 includes a base housing 20 having an internal space and a plate 23 connected to the base housing 20. The base housing 20 includes a front housing 21 and a rear housing 22. The front housing 21 and the rear housing 22 are connected to each other. The plate 23 is connected to the front housing 21. The plate 23 is fixed to the front housing 21 with a plurality of threaded bosses 25. In FIG. 4 and FIG. 5, the plate 23 is indicated by an imaginary line.

The front housing 21 includes part of the upper surface 2C, part of the lower surface 2D, part of the left side surface 2E, and part of the right side surface 2F. The rear housing 22 includes the rear surface 2B, part of the upper surface 2C, part of the lower surface 2D, part of the left side surface 2E, and part of the right side surface 2F. A rear end portion of the front housing 21 and a front end portion of the rear housing 22 are connected to each other, whereby the internal space of the base housing 20 is defined.

The front housing 21 has a recessed portion 24 formed therein. The recessed portion 24 is recessed rearward in a lower portion of the front housing 21. The plate 23 is disposed so as to cover the opening of the recessed portion 24. The plate 23 includes the front surface 2A. In a state in which the housing 2 is carried on the operator WM's back, the plate 23 faces the operator WM's back.

The housing 2 includes the suction port 3, a dust collecting chamber 13 connected to the suction port 3, a motor chamber 15 connected to the dust collecting chamber 13 with a flow path 14 interposed therebetween, and an exhaust port 17 connected to the motor chamber 15 with a flow path 16 interposed therebetween.

The dust collecting chamber 13, the flow path 14, the motor chamber 15, and part of flow path 16 are defined in the internal space of the base housing 20. Part of the flow path 16 is defined between the recessed portion 24 of the front housing 21 and the plate 23.

The dust collecting chamber 13 is disposed in an upper portion of the internal space of the base housing 20. The dust collecting chamber 13 is defined by a partition wall 13W arranged in at least part of the perimeter of the dust collecting chamber 13. The dust collecting chamber 13 accommodates a dust collecting bag 18. The dust collecting bag 18 is connected to the suction port 3. The dust collecting bag 18 is a paper bag, for example. The dust collecting bag 18 is configured to catch and collect dust.

The motor chamber 15 is disposed below the dust collecting chamber 13 in the internal space of the base housing 20. The motor chamber 15 is defined by a partition wall 15W arranged in at least part of the perimeter of the motor chamber 15. The motor chamber 15 accommodates a drive unit 30 including a fan 31 and a motor 32.

The flow path 14 is disposed in a right portion of the internal space of the base housing 20. The flow path 14 is defined by a partition wall 14W arranged in at least part of the perimeter of the flow path 14. The flow path 14 extends in an up-and-down direction. The flow path 14 connects a right portion of the dust collecting chamber 13 and a right portion of the motor chamber 15.

In a boundary between the dust collecting chamber 13 and the flow path 14, a filter 19 is disposed. The filter 19 is a high-efficiency particulate air filter (HEPA), for example. The filter 19 is disposed on a side of the dust collecting chamber 13. In the present embodiment, the filter 19 is disposed on the right side of the dust collecting chamber 13. The filter 19 extends in the up-and-down direction. The filter 19 is disposed so as to face the dust collecting chamber 13.

The flow path 16 connects the motor chamber 15 and the exhaust port 17. Air from the motor chamber 15 is discharged to a space outside the housing 2 through the exhaust port 17.

Figure 6:
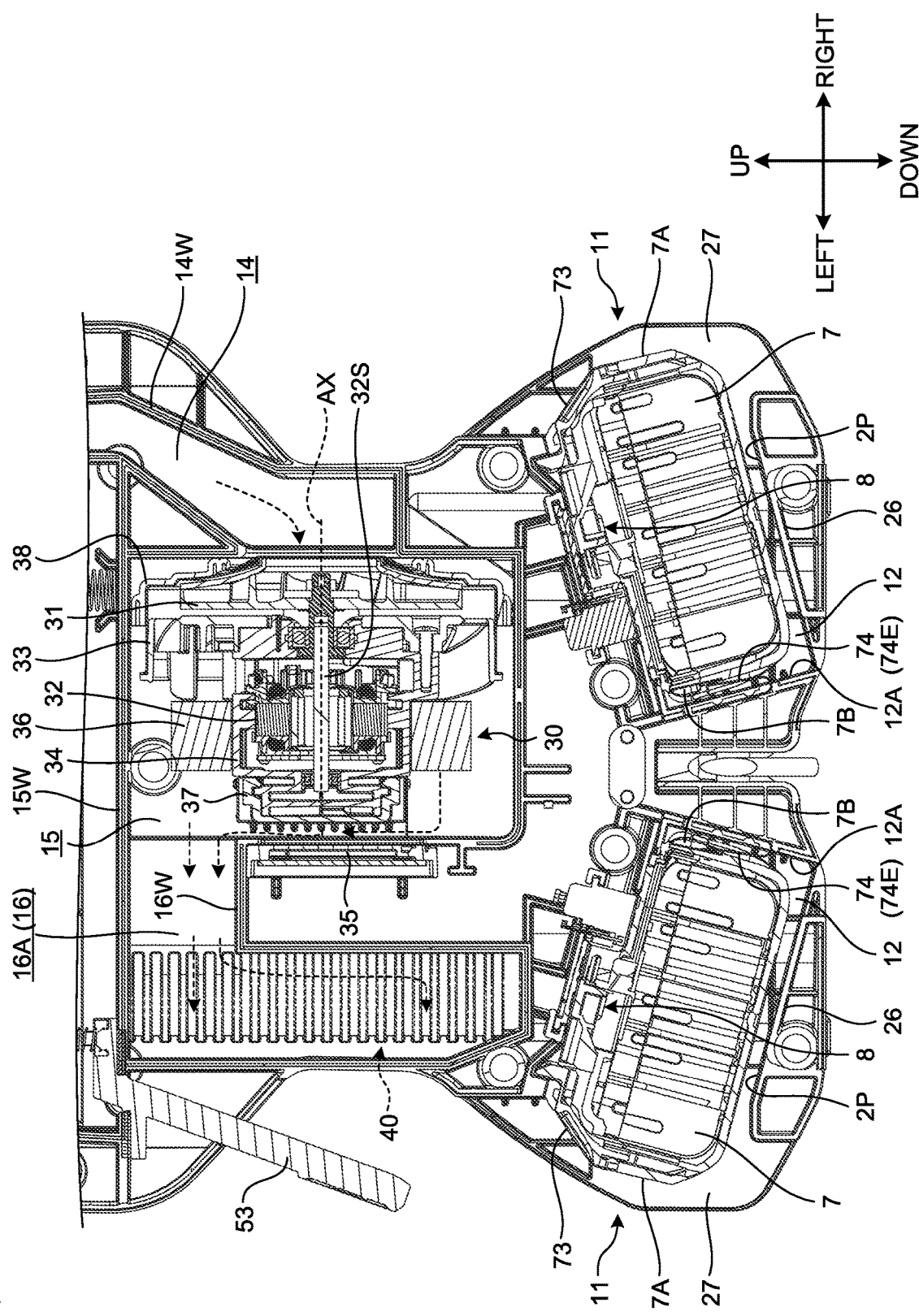
FIG. 6 is a sectional view of the vicinity of a drive unit according to the first embodiment.

FIG. 6 is a sectional view of the vicinity of the drive unit 30 according to the present embodiment. As illustrated in FIG. 6, the drive unit 30 includes the fan 31, the motor 32 configured to generate motive power for rotating the fan 31, a fan cover 33 accommodating the fan 31, a motor case 34 supporting the motor 32, a damper 36 disposed around the motor case 34, a motor support 37 supporting the motor case 34, and a support ring 38 disposed around the fan cover 33. The drive unit 30 is accommodated in the motor chamber 15.

The fan 31 is rotatable about a rotation axis AX. The fan 31 is disposed in the motor chamber 15 below the dust collecting chamber 13 such that the rotation axis AX is orthogonal to the up-and-down direction. The rotation axis AX of the fan 31 extends in a right-and-left direction. An output shaft 32S of the motor 32 is coupled to the fan 31. The rotation axis of the motor 32 corresponds to the rotation axis AX of the fan 31. By driving the motor 32, the fan 31 is rotated about the rotation axis AX.

The motor case 34 is disposed around the motor 32. The damper 36 absorbs noise generated by the motor 32. In other words, the damper 36 has a noise-absorbing function. Examples of the damper 36 include a sponge.

The motor support 37 and the support ring 38 each are an elastic member like rubber. The motor case 34 is fixed to the housing 2 with the motor support 37 and the support ring 38 interposed therebetween.

The backpack dust collector 1 includes a control board 35 disposed in the motor chamber 15. In the present embodiment, the control board 35 serves as a partition wall that defines the motor chamber 15. The control board 35 is disposed on the left side of the motor 32. The control board 35 is disposed downstream of the motor 32 such that a surface of the control board 35 is orthogonal to the rotation axis AX of the fan 31.

Figure 7:
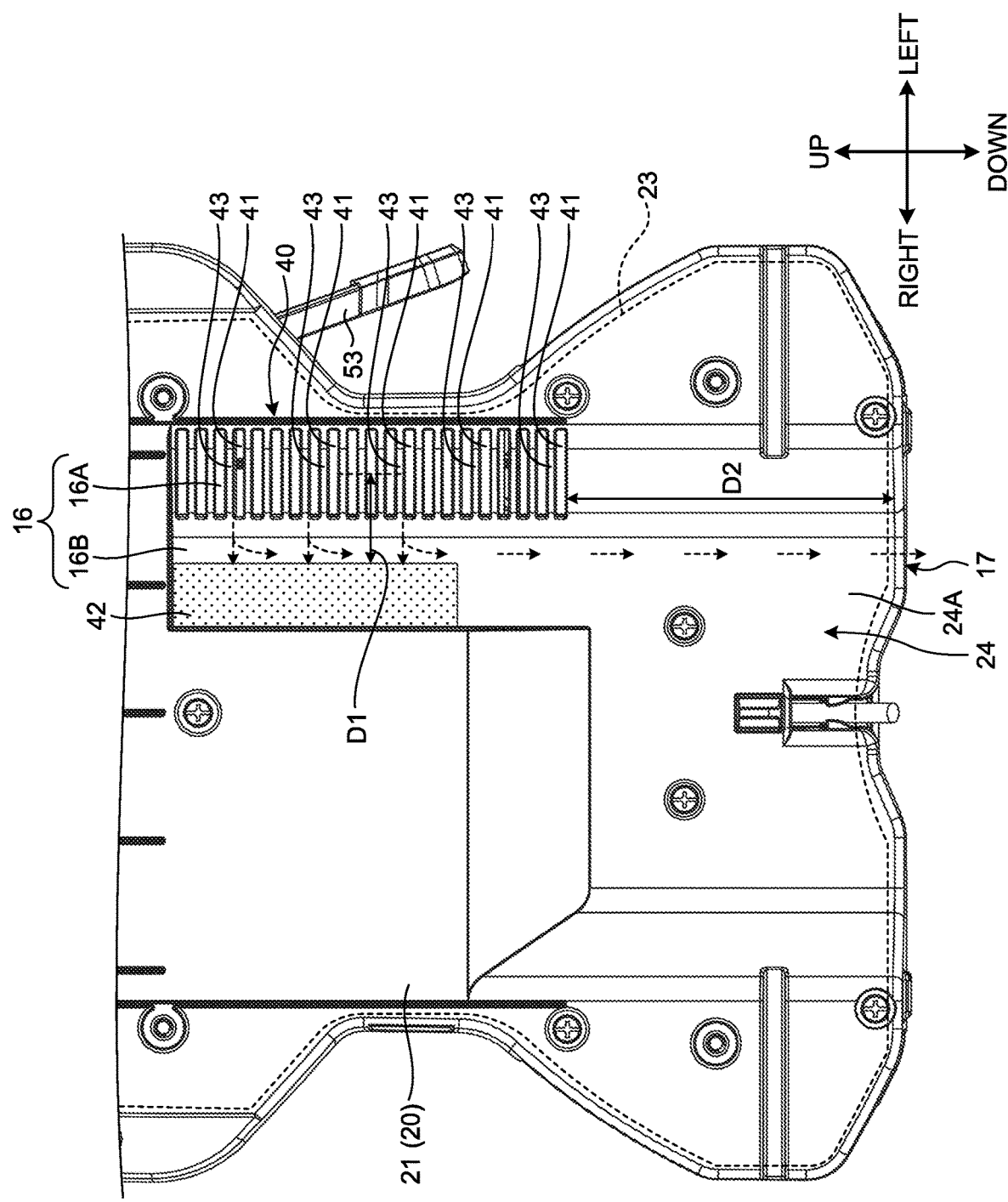
FIG. 7 is a diagram illustrating the vicinity of an exhaust port according to the first embodiment.
Figure 8:
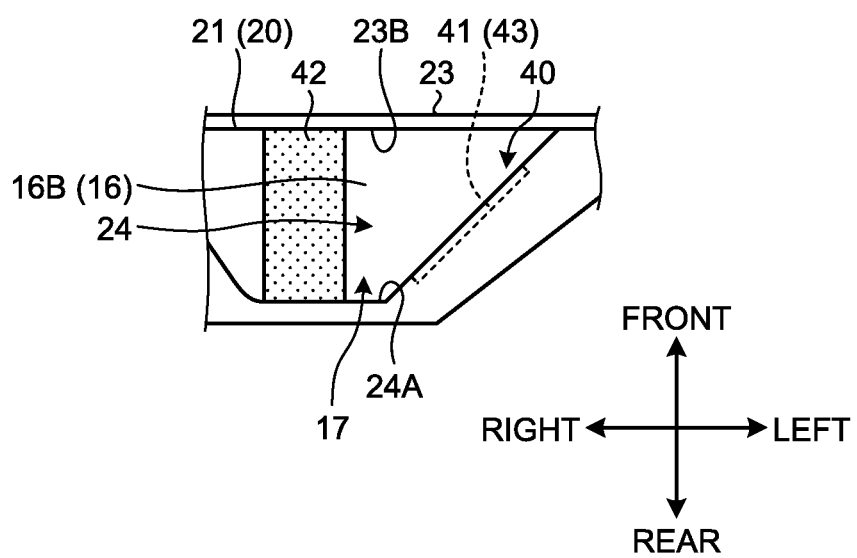
FIG. 8 is a diagram illustrating the exhaust port according to the first embodiment when viewed from below.

FIG. 7 is a diagram illustrating the vicinity of the exhaust port 17 according to the present embodiment. FIG. 8 is a diagram illustrating the exhaust port 17 according to the present embodiment when viewed from below. In FIG. 7, the plate 23 is indicated by an imaginary line.

The backpack dust collector 1 includes a slit portion 40 disposed in the flow path 16 between the motor chamber 15 and the exhaust port 17 and having one or more slit-shaped vents 41 through which air from the motor chamber 15 passes.

The slit portion 40 is provided to at least part of the housing 2. In the present embodiment, the slit portion 40 is provided to the front housing 21. In other words, the vents 41 are formed in part of the front housing 21.

The vent 41 is narrow and long in the right-and-left direction. The longitudinal direction of the vent 41 corresponds to the right-and-left direction, and the widthwise direction of the vent 41 corresponds to the up-and-down direction. The vents 41 are aligned in the up-and-down direction. Between the vents 41 adjacent to each other, a rib 43 is provided.

The slit portion 40 is disposed in the flow path 16 between the motor chamber 15 and the exhaust port 17. The ribs 43 of the slit portion 40 divide the flow path 16 into a flow path 16A near the motor chamber 15 and a flow path 16B near the exhaust port 17. The flow path 16A between the motor chamber 15 and the slit portion 40 is defined in the internal space of the base housing 20. As illustrated in FIG. 3 and FIG. 6, the flow path 16A is defined by a partition wall 16W arranged in at least part of the perimeter of the flow path 16A. The flow path 16B between the slit portion 40 and the exhaust port 17 is defined between the recessed portion 24 of the front housing 21 and the plate 23.

The dimension of each vent 41 in the widthwise direction is small. The dimension of the vent 41 in the widthwise direction is so small that foreign matters in a space outside the housing 2 are prevented from entering the internal space (flow path 16A) of the housing 2.

The flow path 16B extends in the up-and-down direction. The flow path 16B is defined between an inner surface 24A of the recessed portion 24 of the front housing 21 and a rear surface 23B of the plate 23. The exhaust port 17 is defined in a lower end portion of the flow path 16B. In other words, the exhaust port 17 is defined by a lower end portion of the inner surface 24A of the recessed portion 24 and a lower end portion of the rear surface 23B of the plate 23.

In a state in which the housing 2 is carried on the operator WM's back, the vents 41 face laterally. In the present embodiment, the vents 41 face rightward. In the state in which the housing 2 is carried on the operator WM's back, the exhaust port 17 faces downward.

The backpack dust collector 1 includes a noise-absorbing member 42 disposed in at least part of the flow path 16B between the vents 41 and the exhaust port 17.

As illustrated in FIG. 7 and FIG. 8, the noise-absorbing member 42 is disposed so as to face the vents 41. The noise-absorbing member 42 faces each of the vents 41. At least part of the noise-absorbing member 42 is fixed to the inner surface 24A of the recessed portion 24. At least part of the noise-absorbing member 42 is fixed to the rear surface 23B of the plate 23.

The noise-absorbing member 42 includes a porous member. The noise-absorbing member 42 absorbs noise transmitted through air to suppress generation of noise. Examples of noise generated by the backpack dust collector 1 include wind noise generated when air passes through the vents 41 and NZ noise generated by rotation of the fan 31.

The noise-absorbing member 42 is an open-cell porous member. The noise-absorbing member 42 has numerous minute cells. The open cell means that the cells are connected to one another. As the open-cell porous member, at least one of soft urethane sponge, glass wool, rock wool, and felt is exemplified.

The open cell has a noise-absorbing function. Noise impinges on the cells at a surface of the noise-absorbing member 42. The noise impinging on the cells at the surface of the noise-absorbing member 42 propagates to adjacent cells. The noise strikes the inner surfaces of the cells. The cells are connected to one another. The noise propagates to other cells while reflecting off the inner surfaces of the cells. The energy of the noise is attenuated by striking the inner surfaces of the cells many times. Thus, the noise is reduced.

As illustrated in FIG. 7, the distance D1 between each vent 41 and the noise-absorbing member 42 is shorter than the distance D2 between the vent 41 and the exhaust port 17. The distance D2 is at least two times longer than the distance D1. The distance D1 is a distance between the center of the vent 41 in the longitudinal direction of the vent 41 and the noise-absorbing member 42.

The fan 31 rotates about the rotation axis AX, thereby generating suction force at the suction port 3. Air that has been suctioned with dust through the suction opening of the nozzle 6 by generating the suction force at the suction port 3 passes through the pipe 5 and the hose 4.

As indicated by arrows in FIG. 3, FIG. 6, and FIG. 7, the air that has passed through the pipe 5 and the hose 4 is introduced into the dust collecting chamber 13 through the suction port 3. To the suction port 3, the dust collecting bag 18 is connected. Dust contained in the air is caught and collected by the dust collecting bag 18. The air passes through the dust collecting bag 18. The air that has passed through the dust collecting bag 18 passes through the filter 19. The filter 19 catches and collects fine dust that cannot be caught by the dust collecting bag 18. The air that has passed through the filter 19 passes through the flow path 14, and then flows into the motor chamber 15. The air that has flowed into the motor chamber 15 passes through the fan 31 and the motor 32, comes into contact with the control board 35, and then flows into the flow path 16A. The air that has flowed through the flow path 16A passes through the vents 41 and flows into the flow path 16B. The air that has flowed through the flow path 16B is discharged through the exhaust port 17.

The slit-shaped vents 41 prevent foreign matters from entering the flow path 16A. Air flowing through the vents 41 may generate noise like wind noise. In the present embodiment, the noise-absorbing member 42 is disposed downstream of the vents 41. The noise-absorbing member 42 suppresses generation of such noise.

Figure 9:
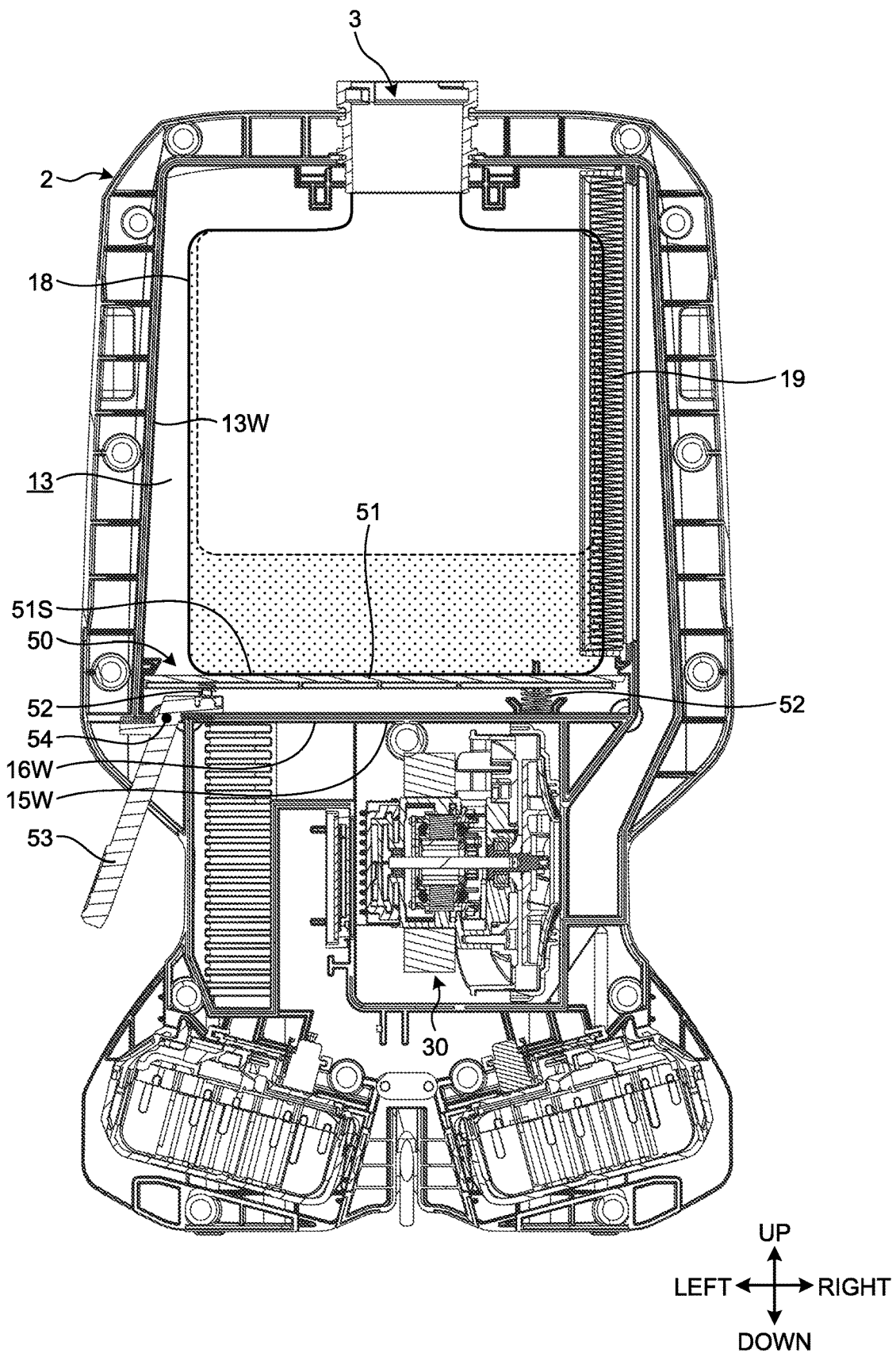
FIG. 9 is a sectional view of a dust collecting bag according to the first embodiment.

FIG. 9 is a sectional view of the dust collecting bag 18 according to the present embodiment. As illustrated in FIG. 9, when dust has been accumulated in the dust collecting bag 18, load due to the weight of the dust is applied to the bottom surface of the dust collecting chamber 13 from the dust collecting bag 18. In the present embodiment, the filter 19 is disposed on a side of the dust collecting chamber 13 so as to face the dust collecting chamber 13 in a state in which the housing 2 is carried on the operator WM's back. In the present embodiment, the filter 19 is disposed on the right side of the dust collecting chamber 13. This prevents the filter 19 from being clogged by the dust collecting bag 18 even when dust has been accumulated in the dust collecting bag 18. Because the filter 19 is prevented from being clogged, reduction of the suction force of the backpack dust collector 1 is suppressed.

The backpack dust collector 1 includes a vibration device 50 configured to vibrate the dust collecting bag 18. As illustrated in FIG. 9, at least part of dust may stick to an upper portion of the inner surface of the dust collecting bag 18. When dust has stuck up to the upper portion of the inner surface of the dust collecting bag 18, the flow rate of air passing through the dust collecting bag 18 decreases, whereby the suction force of the backpack dust collector 1 may be reduced. When the vibration device 50 vibrates the dust collecting bag 18, the dust sticking to the upper portion of the inner surface of the dust collecting bag 18 is shaken off, and piles up in a lower portion of the dust collecting bag 18. Thus, reduction of the suction force of the backpack dust collector 1 is suppressed.

In the present embodiment, the vibration device 50 includes a support member 51 supported by elastic members 52 and having a support surface 51S that can be brought into contact with the dust collecting bag 18.

The support member 51 is a plate-like member. As illustrated in FIG. 9, the support member 51 is disposed below the dust collecting bag 18 in the dust collecting chamber 13. The support surface 51S includes an upper surface of the support member 51 that can be brought into contact with a lower portion of the dust collecting bag 18.

The elastic members 52 are coil springs, for example. The elastic members 52 support a lower surface of the support member 51. In the present embodiment, the elastic members 52 are supported by the partition wall 15W and the partition wall 16W that are disposed below the support member 51. The support member 51 is supported by the partition wall 15W and the partition wall 16W with the elastic members 52 interposed therebetween. The elastic members 52 support the support member 51 in a swingable manner.

The backpack dust collector 1 includes an operating member 53 for moving the support member 51. The operating member 53 is operated by the operator WM. An upper end portion of the operating member 53 is arranged so as to face a lower surface of the support member 51. A lower end portion of the operating member 53 is arranged outside the housing 2. An intermediate portion of the operating member 53 is coupled to at least part of the housing 2 by a hinge 54.

Figure 10:
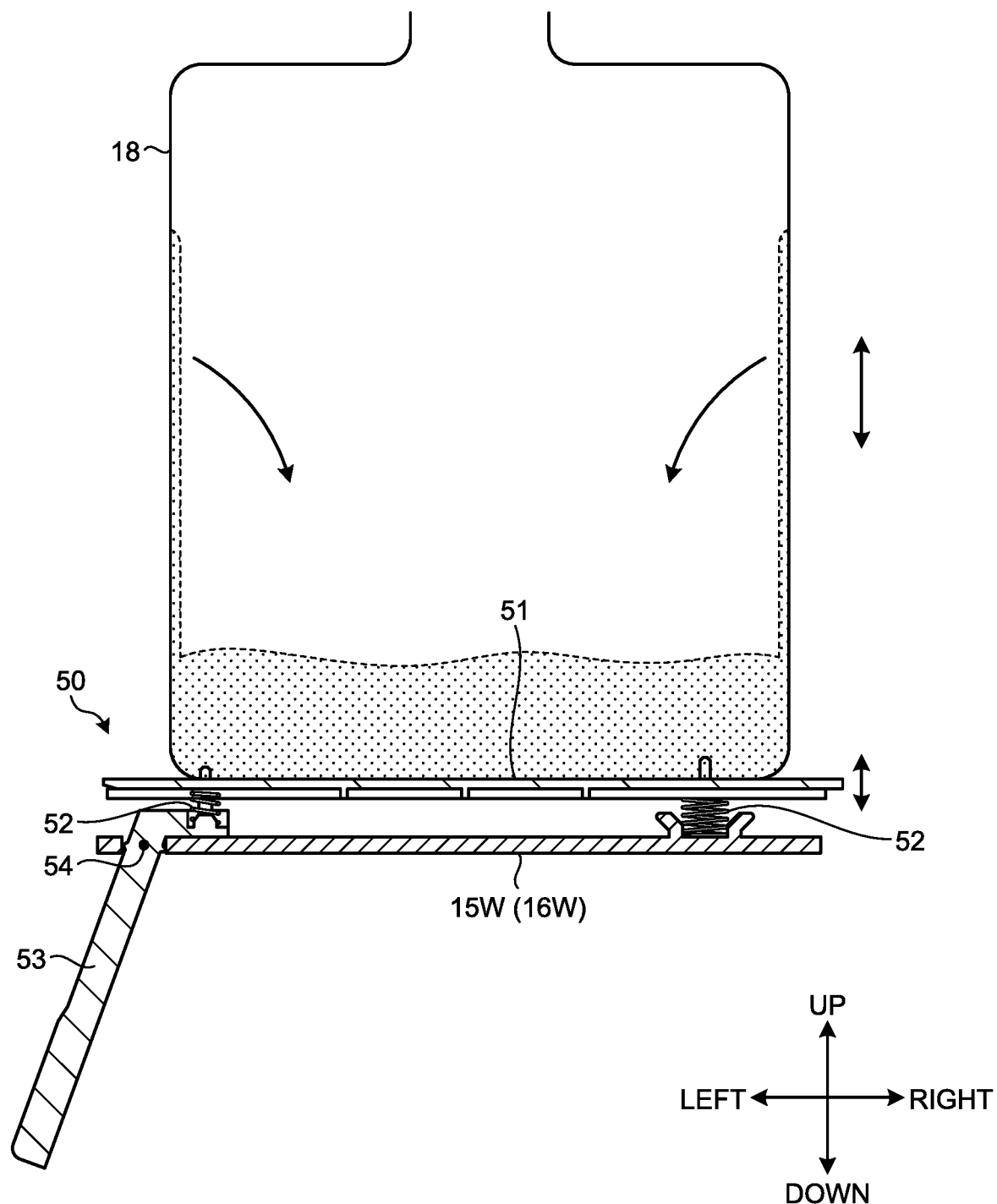
FIG. 10 is a diagram for describing motion of a vibration device according to the first embodiment.

FIG. 10 is a diagram for describing motion of the vibration device 50 according to the present embodiment. When the operator WM moves or walks while carrying the housing 2 on his/her back, the housing 2 moves accordingly. When the housing 2 moves, the support member 51 supported by the elastic members 52 vibrates with an amplitude greater than the amplitude of the housing 2. When the housing 2 moves, vibrations of the housing 2 are transmitted to the support member 51 in an amplified manner due to the effect of the elastic members 52. When the support member 51 vibrates greatly, the dust collecting bag 18 supported by the support member 51 accordingly vibrates greatly. When the dust collecting bag 18 vibrates greatly, dust sticking to an upper portion of the inner surface of the dust collecting bag 18 is shaken off, and piles up in a lower portion of the dust collecting bag 18 as illustrated in FIG. 10. Thus, reduction of the suction force of the backpack dust collector 1 is suppressed.

Figure 11:
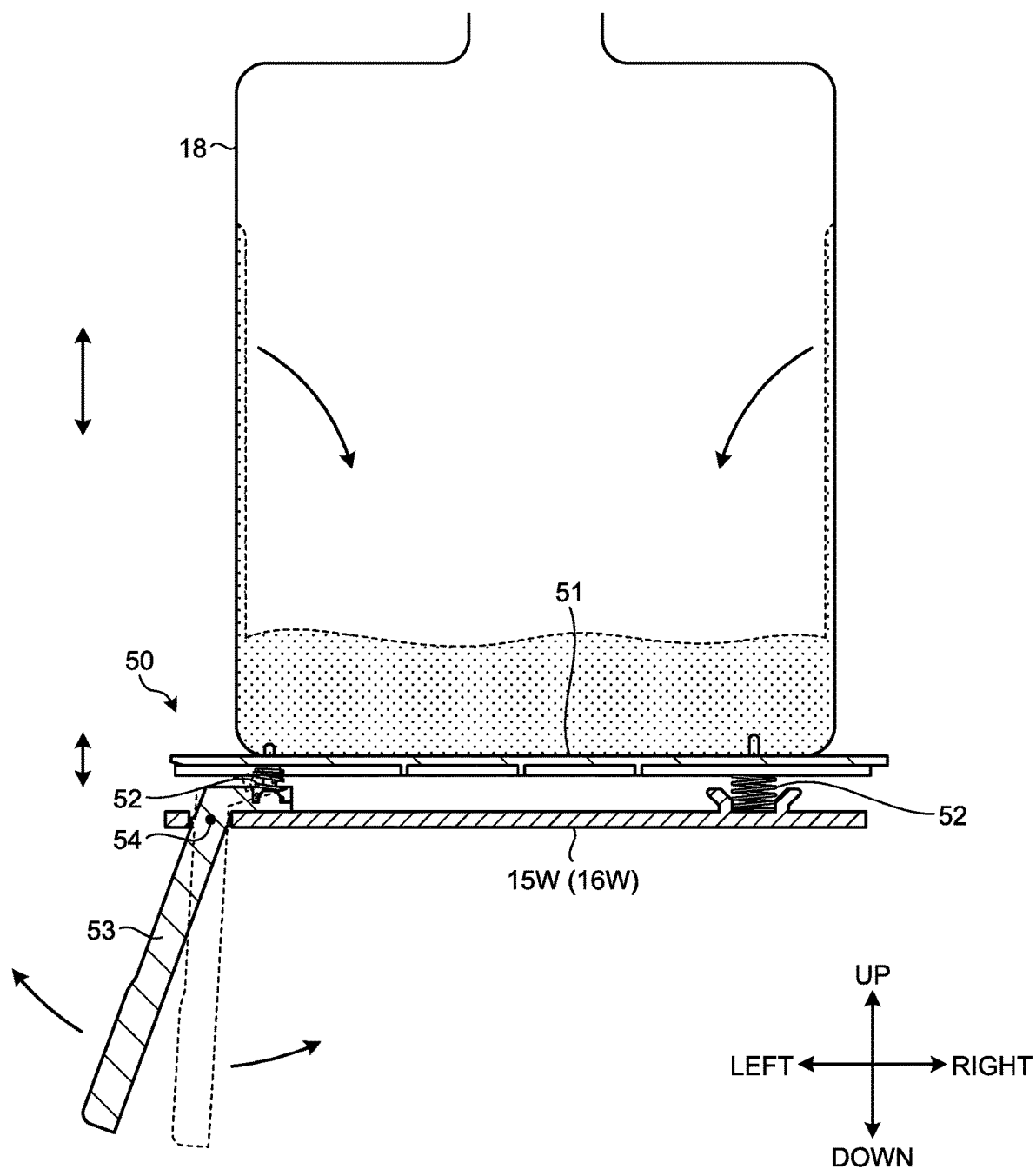
FIG. 11 is a diagram for describing motion of an operating member according to the first embodiment.

FIG. 11 is a diagram for describing motion of the operating member 53 according to the present embodiment. As illustrated in FIG. 11, the operator WM can operate the operating member 53 such that the operating member 53 rotates about the rotation axis of the hinge 54. When the operating member 53 is operated, the upper end portion of the operating member 53 moves up and down while being in contact with the support member 51. Thus, the support member 51 greatly vibrates up and down. When the support member 51 greatly moves up and down, the dust collecting bag 18 supported by the support member 51 accordingly moves greatly. When the dust collecting bag 18 vibrates greatly, dust sticking to an upper portion of the inner surface of the dust collecting bag 18 is shaken off, and piles up in a lower portion of the dust collecting bag 18 as illustrated in FIG. 11. Thus, reduction of the suction force of the backpack dust collector 1 is suppressed.

As illustrated in FIG. 2, FIG. 3, FIG. 5, and FIG. 6, the battery openings 11 are respectively formed on the left side surface 2E and the right side surface 2F of the housing 2. The battery openings 11 and the battery receiving portions 12 are formed at lower portions of the housing 2.

Each battery mounting portion 8 is arranged on an upper surface of the corresponding battery receiving portion 12. The battery mounting portion 8 has guide rails 81 configured to guide the corresponding battery 7 and a connection terminal 82 configured to be connected to a battery terminal 72 of the battery 7. The guide rails 81 extend in the right-and-left direction. The guide rails 81 in a pair are arranged in the front-and-rear direction. The guide rails 81 in a pair are arranged in parallel. The connection terminal 82 is arranged between the pair of guide rails 81.

The battery 7 is a general-purpose battery. The battery 7 may be a battery for a power tool. In the present embodiment, the battery 7 can be used as a direct-current power supply for a power tool. The battery 7 includes a plurality of lithium ion battery cells. The battery 7 can be charged by a battery charger. The battery 7 is portable. The battery 7 supplies power to at least the motor 32.

The battery 7 has a pair of slide rails 71 to be guided by the guide rails 81, the battery terminal 72 to be connected to the connection terminal 82 of the battery mounting portion 8, and a release button 73.

The slide rails 71 are guided by the guide rails 81 of the battery mounting portion 8. The slide rails 71 in a pair are arranged in parallel. The battery terminal 72 is arranged between the pair of slide rails 71. In a state in which the battery 7 is mounted on the battery mounting portion 8, the battery terminal 72 is connected to the connection terminal 82.

The release button 73 is operated to release the battery 7 fixed to the battery mounting portion 8. The release button 73 is provided on one end surface 7A of the battery 7. The battery 7 is mounted on the battery mounting portion 8 such that the release button 73 is directed outward in the right-and-left direction with respect to the center of the housing 2. In the state in which the battery 7 is mounted on the battery mounting portion 8, the release button 73 faces the battery opening 11.

In the present embodiment, the battery mounting portion 8 is inclined downward in the battery receiving portion 12 as farther from the battery opening 11. In other words, the battery mounting portion 8 is inclined downward toward a deeper position in the battery receiving portion 12. The guide rails 81 are inclined downward in the battery receiving portion 12 as farther from the battery opening 11.

The front housing 21 and the rear housing 22 have respective bottom plates 26 that define bottom surfaces 2P of the battery receiving portions 12. Each of the bottom surfaces 2P faces part of the lower surface of the battery 7 mounted on the corresponding battery mounting portion 8. The bottom surfaces 2P are inclined downward in the battery receiving portion 12 as farther from the battery opening 11. The bottom plate 26 of the front housing 21 is fixed to at least part of the front housing 21 with a rib interposed therebetween. The bottom plate 26 of the rear housing 22 is fixed to at least part of the rear housing 22 with a rib interposed therebetween. In a lower portion of the battery receiving portion 12, an opening 12K is formed. The opening 12K is disposed between the bottom plate 26 of the front housing 21 and the bottom plate 26 of the rear housing 22.

The front housing 21 and the rear housing 22 include inner side plates 27 that define inner side surfaces 2Q connected to the battery openings 11. Each of the inner side surfaces 2Q faces part of a side surface of the battery 7 passing through the battery opening 11. The inner side surfaces 2Q of the front housing 21 are inclined rearward in the battery receiving portion 12 as farther from the respective battery openings 11. The inner side surfaces 2Q of the rear housing 22 are inclined forward in the respective battery receiving portions 12 as farther from the respective battery openings 11. In other words, the width of a passage in the front-and-rear direction through which the battery 7 passes in the battery receiving portion 12 is smaller in the battery receiving portion 12 at a position more separated from the battery opening 11.

Figure 12:
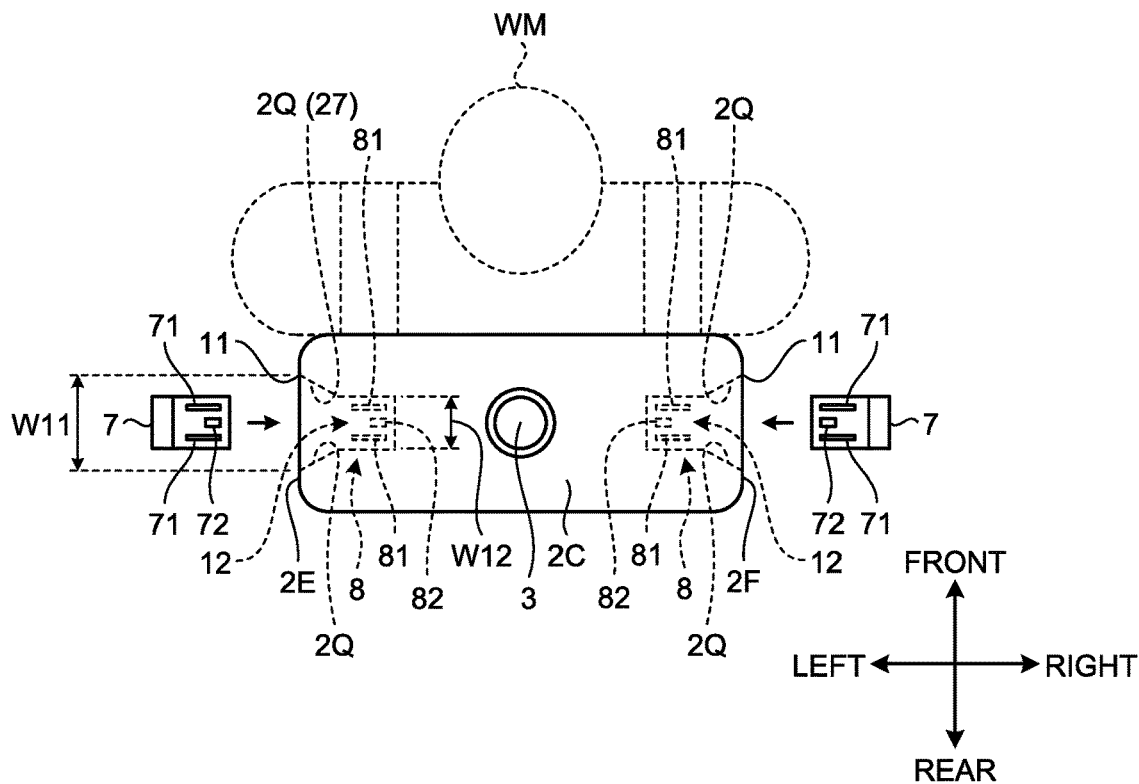
FIG. 12 is a top view schematically illustrating motion when batteries according to the first embodiment are mounted on battery mounting portions.

FIG. 12 is a top view schematically illustrating motion when the batteries 7 according to the present embodiment are mounted on the battery mounting portions 8. When mounting the batteries 7 on the battery mounting portions 8, the operator WM inserts the batteries 7 into the battery receiving portions 12 through the battery openings 11 respectively formed in the left side surface 2E and the right side surface 2F, thereby being able to mount the batteries 7 on the battery mounting portions 8.

When mounting a battery 7 on the left battery mounting portion 8, the operator WM inserts the battery 7 into the battery opening 11 formed on the left side surface 2E. The operator WM slides the battery 7 rightward while causing the guide rails 81 of the battery mounting portion 8 to guide the slide rails 71 of the battery 7. When the battery 7 has been slid rightward, the battery 7 is fixed to the battery mounting portion 8, and the battery terminal 72 of the battery 7 is connected to the connection terminal 82 of the battery mounting portion 8. Thus, the battery 7 is mounted on the battery mounting portion 8.

When mounting a battery 7 on the right battery mounting portion 8, the operator WM inserts the battery 7 into the battery opening 11 formed on the right side surface 2F, and then slides the battery leftward, thereby being able to mount the battery 7 on the battery mounting portion 8.

As illustrated in FIG. 2 and FIG. 12, in the present embodiment, the dimension W11 of each battery opening 11 in the front-and-rear direction is larger than the dimension W12 of the corresponding battery receiving portion 12 in the front-and-rear direction where the corresponding guide rails 81 are arranged. The dimension W11 corresponds to the distance between end portions of the pair of inner side surfaces 2Q that are closest to the battery opening 11. The dimension W12 corresponds to the distance between end portions of the pair of inner side surfaces 2Q that are closest to the guide rails 81. Because the dimension W11 of the battery opening 11 is large, the operator WM can insert the corresponding battery 7 smoothly into the battery opening 11. The operator WM can insert the battery 7 into the battery opening 11 while holding, for example, side surfaces of the battery 7. Because the dimension W12 of the battery receiving portion 12 is small, the battery 7 can be moved in the battery receiving portion 12 while being guided by the inner side surfaces of the battery receiving portion 12 that are located deeper than the corresponding inner side plates 27 and also by the guide rails 81 in the battery receiving portion 12.

Furthermore, because the corresponding bottom plate 26 is provided, the battery 7 can be prevented from falling from the battery receiving portion 12 when the battery 7 is mounted on the battery mounting portion 8 or when the battery 7 is pulled out of the battery mounting portion 8.

As illustrated in FIG. 3 and FIG. 6, the backpack dust collector 1 includes moving mechanisms 74 each disposed in the corresponding battery receiving portion 12 and configured to generate force for moving the corresponding battery 7 toward the corresponding battery opening 11. Each moving mechanism 74 is disposed at a position where it can be in contact with the corresponding battery 7.

The moving mechanism 74 includes an elastic member 74E. Examples of the elastic member 74E include a leaf spring. The elastic member 74E may include a coil spring.

The elastic member 74E is disposed so as to face the other end surface 7B of the battery 7 in a state in which the battery 7 is mounted on the battery mounting portion 8. The elastic member 74E is disposed on the opposed surface 12A of the battery receiving portion 12. In the state in which the battery 7 is mounted on the battery mounting portion 8, the other end surface 7B of the battery 7 faces the opposed surface 12A. In the state in which the battery 7 is mounted on the battery mounting portion 8, the other end surface 7B of the battery 7 is in contact with the elastic member 74E.

Figure 13:
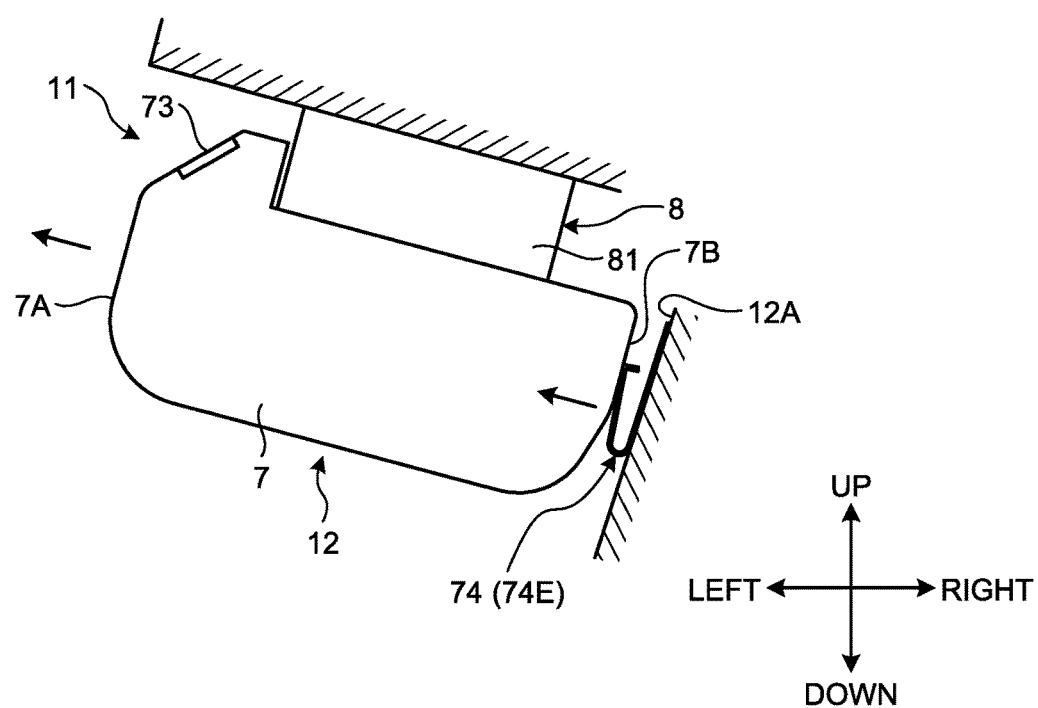
FIG. 13 is a diagram schematically illustrating a state in which a battery according to the first embodiment is mounted on a battery mounting portion.

FIG. 13 is a diagram schematically illustrating a state in which a battery 7 according to the present embodiment is mounted on a battery mounting portion 8. The guide rails 81 of the battery mounting portion 8 are inclined downward in the corresponding battery receiving portion 12 as farther from the corresponding battery opening 11. In the state in which the battery 7 is mounted on the battery mounting portion 8, the other end surface 7B of the battery 7 is in contact with the corresponding elastic member 74E. In the state in which the battery 7 is mounted on the battery mounting portion 8, the elastic member 74E is elastically deformed by the battery 7. The elastic member 74E thus elastically deformed generates elastic force for moving the battery 7 toward the battery opening 11.

When removing the battery 7 from the battery mounting portion 8, the operator WM operates the corresponding release button 73. When the release button 73 has been operated, the battery 7 fixed to the battery mounting portion 8 is released. When the battery 7 fixed to the battery mounting portion 8 has been released, the battery 7 is moved toward the battery opening 11 by the elastic force generated by the elastic member 74E. By the elastic force generated by the elastic member 74E, at least part of the battery 7 including the one end surface 7A is ejected outside the battery receiving portion 12 through the battery opening 11. This allows the operator WM to hold the battery 7 smoothly. While holding the battery 7 pulled out of the battery mounting portion 8, the operator WM can remove the battery from the battery receiving portion 12.

As described in the foregoing, according to the present embodiment, the noise-absorbing member 42 is disposed in at least part of the flow path 16 between the vents 41 and the exhaust port 17. This suppresses generation of noise. Furthermore, the slit portion 40 prevents foreign matters from entering the internal space of the housing 2.

The noise-absorbing member 42 is disposed so as to face the vents 41. Thus, the noise-absorbing member 42 can effectively reduce wind noise generated when air passes through the vents 41.

The distance D1 between the vent 41 and the noise-absorbing member 42 is shorter than the distance D2 between the vent 41 and the exhaust port 17. Thus, wind noise generated when air passes through the vents 41 can be effectively prevented from leaking to an external space of the housing 2 through the exhaust port 17.

The housing 2 includes the base housing 20 and the plate 23 connected to the base housing 20. The flow path 16B between the slit portion 40 and the exhaust port 17 is defined between the base housing 20 and the plate 23. This makes it possible to connect the base housing 20 and the plate 23 after disposing the noise-absorbing member 42 in the flow path 16B.

In a state in which the housing 2 is carried on the operator WM's back, the vents 41 face laterally and the exhaust port 17 faces downward. Thus, air that has passed through the vents 41 is discharged downward from the exhaust port 17.

The noise-absorbing member 42 includes the porous member. Thus, the noise-absorbing member 42 can effectively absorbs noise.

Second Embodiment

In the following description, components that are the same as or equivalent to those in the above-described embodiment are designated by the same signs, and description thereof is simplified or omitted.

In the above-described embodiment, the slit portion 40 is provided to at least part of the housing 2. Specifically, the vents 41 are formed in part of the front housing 21. The front housing 21 and the slit portion 40 may be separate components.

Figure 14:
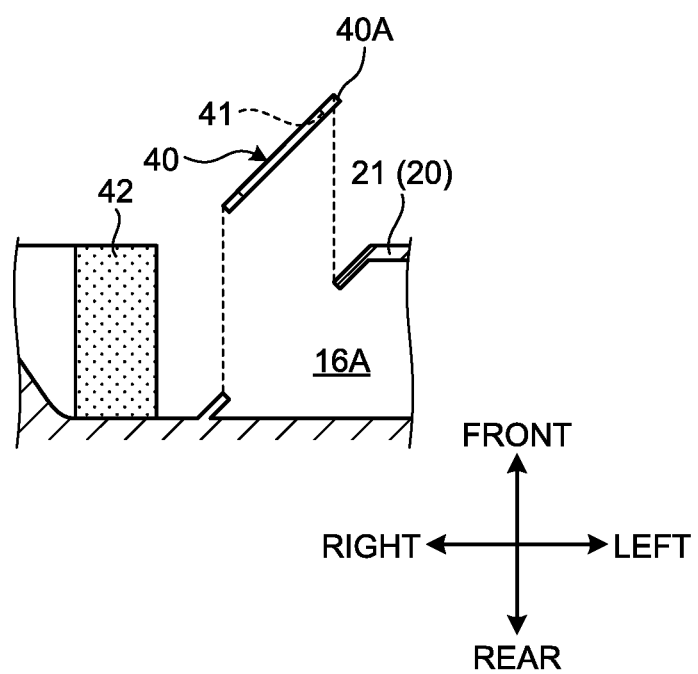
FIG. 14 is a diagram schematically illustrating vents according to a second embodiment.

FIG. 14 is a diagram schematically illustrating vents 41 according to the present embodiment. As illustrated in FIG. 14, the slit portion 40 is provided to a slit member 40A that is attachable to and detachable from the base housing 20. The slit member 40A includes the vents 41. The slit member 40A is fitted into an opening formed in the front housing 21 in a detachable manner.

Third Embodiment

Figure 15:
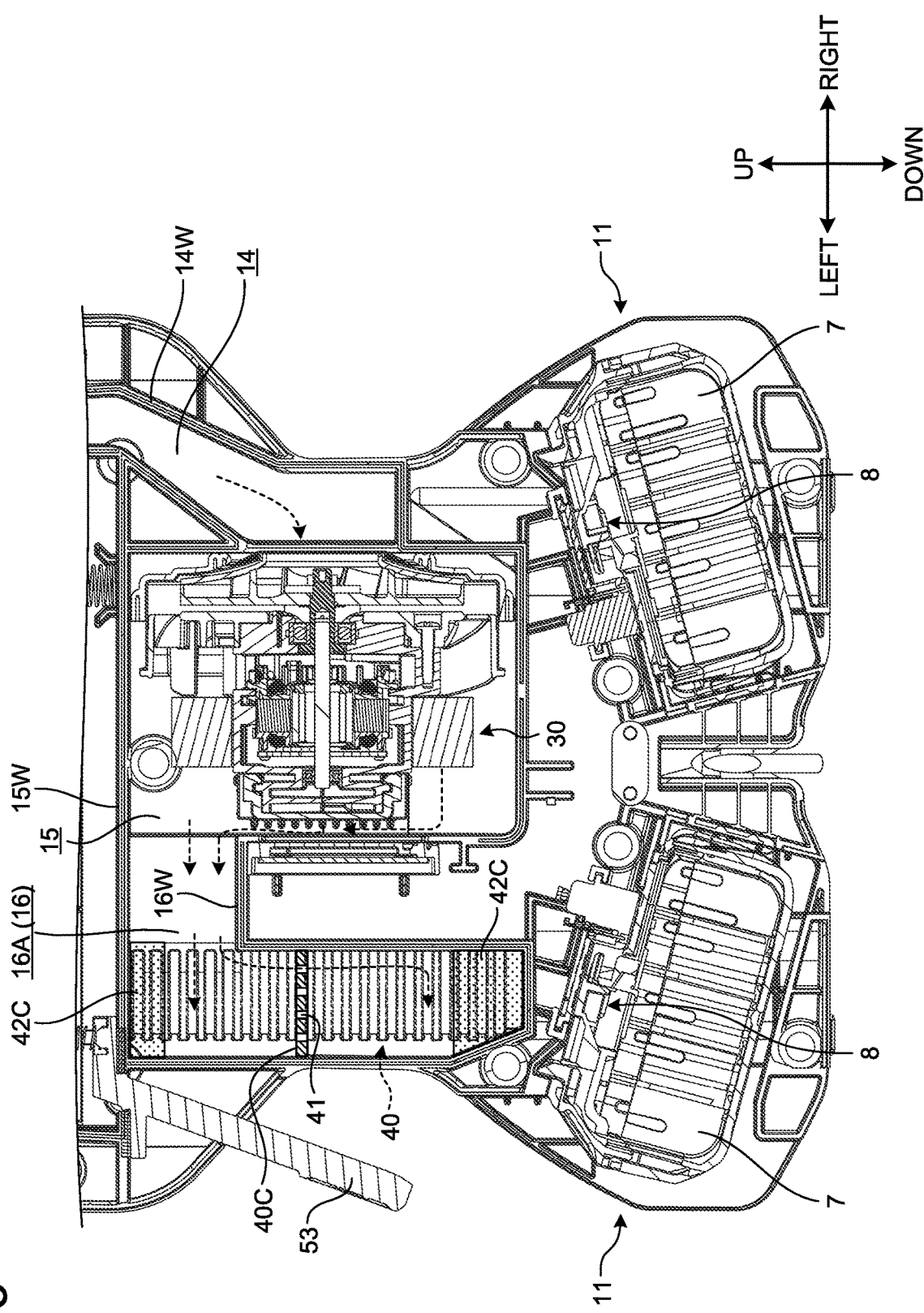
FIG. 15 is a sectional view of the vicinity of a drive unit according to a third embodiment.

FIG. 15 is a sectional view of the vicinity of a drive unit 30 according to the present embodiment. As illustrated in FIG. 15, a slit member 40C having vents 41 may be disposed in the flow path 16A of the base housing 20. Furthermore, a noise-absorbing member 42C may be disposed in the flow path 16A.

Fourth Embodiment

In the above-described embodiments, the noise-absorbing member 42 is provided to the backpack dust collector. The noise-absorbing member 42 may be provided to a dust collector including casters.

Figure 16:
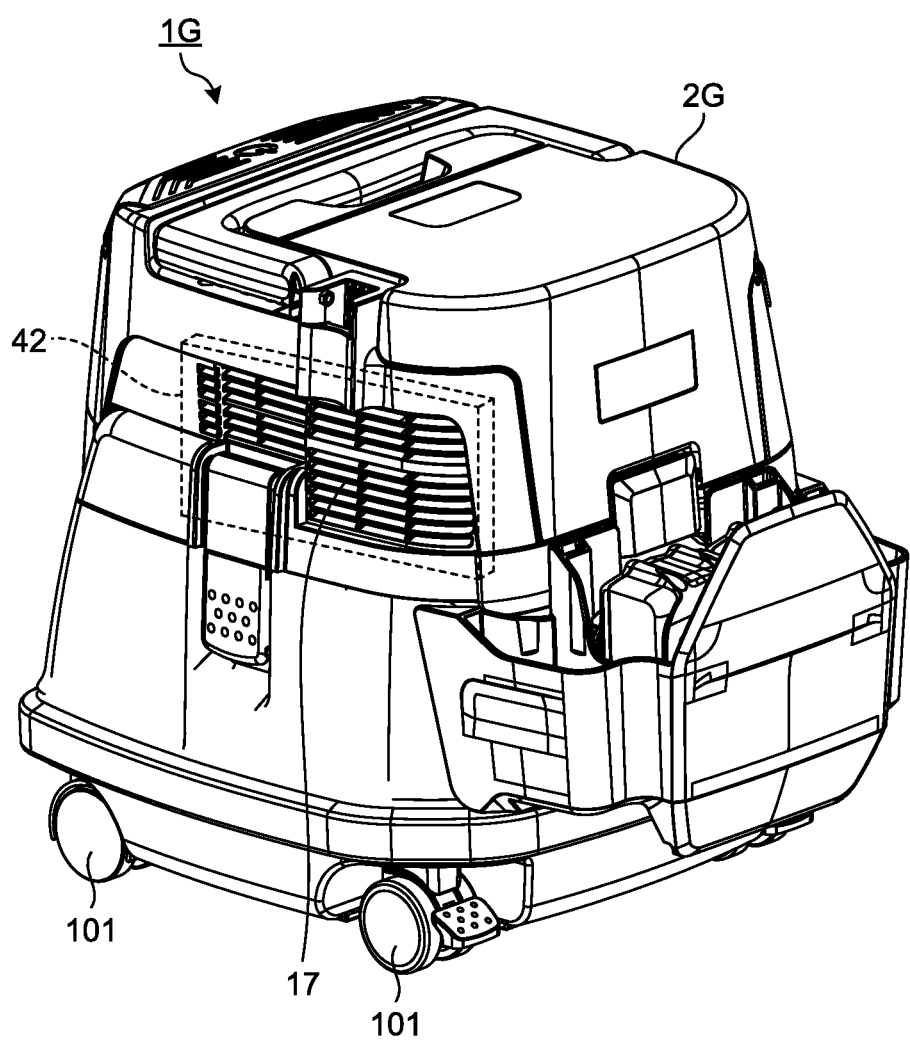
FIG. 16 is a perspective view of a dust collector according to a fourth embodiment.

FIG. 16 is a perspective view of a dust collector 1G according to the present embodiment. The dust collector 1G includes one or more batteries, a housing 2G accommodating a drive unit including a fan and a motor, and casters 101 movably supporting the housing 2G. The motor is driven by power supplied from the batteries. An exhaust port 17 is formed in the housing 2G. In an internal space of the housing 2G, a slit portion having slit-shaped vents is provided. The noise-absorbing member 42 is disposed in at least part of a flow path between the vents and the exhaust port 17 in the internal space of the housing 2G.

Other Embodiments

In the above-described embodiments, a plurality of narrowed portions may be formed in the flow path 16. A baffle may be provided in at least part of the flow path 16. The noise-absorbing member 42 may be disposed on the front surface 2A facing to the operator WM's back.

According to an aspect of the present invention, generation of noise can be suppressed.

What is claimed is:

1. A backpack dust collector configured to be carried on a back of a user, comprising:
  a housing that includes
    a suction port,
    a dust collecting chamber connected to the suction port and configured to accommodate a dust collecting bag,
    a motor chamber connected to the dust collecting chamber and accommodating
      a fan,
      a motor, and
      a motor case that encases and supports the motor, and
    an exhaust port configured to discharge air from an area of the motor chamber exterior to the motor case;
  a slit portion in a flow path between the area of the motor chamber exterior to the motor case and the exhaust port and including at least two slit-shaped vents configured such that the air from the area of the motor chamber exterior to the motor case passes through the at least two slit-shaped vents; and
  a noise-absorbing member in a portion of the flow path between the at least two slit-shaped vents and the exhaust port,
  wherein:
    the dust collecting chamber, the motor chamber, the motor case and the fan are configured such that air driven by the fan flows, in sequence, from the dust collecting chamber to the area of the motor chamber exterior to the motor case, through the at least two slit-shaped vents, and to the exhaust port;
    the at least two slit-shaped vents are spaced in a first direction that is an up-and-down direction when the backpack dust collector is carried on the back of the user; and
    each of the at least two slit-shaped vents has a longitudinal direction that is (1) in a largest dimension of the each of the at least two slit-shaped vents and (2) substantially perpendicular to the up-and-down direction.

2. The backpack dust collector according to claim 1, wherein
  the noise-absorbing member faces the each of the at least two slit-shaped vents.

3. The backpack dust collector according to claim 2, wherein
  the longitudinal direction of the each of the at least two slit-shaped vents corresponds to a right-and-left direction of the backpack dust collector when the backpack dust collector is carried on the back of the user,
  a widthwise direction of the each of the at least two slit-shaped vents corresponds to the up-and-down direction of the backpack dust collector,
  the each of the at least two slit-shaped vents has ends in the longitudinal direction, and
  the at least two slit-shaped vents are aligned in the up-and-down direction.

4. The backpack dust collector according to claim 1, wherein a distance between the each of the at least two slit-shaped vents and the noise-absorbing member is shorter than a distance between the each of the at least two slit-shaped vents and the exhaust port.

5. The backpack dust collector according to claim 4, wherein the distance between the each of the at least two slit-shaped vents and the exhaust port is at least two times longer than the distance between the each of the at least two slit-shaped vents and the noise-absorbing member.

6. The backpack dust collector according to claim 1, wherein the at least two slit-shaped vents are formed in at least a part of the housing.

7. The backpack dust collector according to claim 1, wherein
the housing includes a base housing and a plate connected to the base housing, and
the portion of the flow path between the at least two slit-shaped vents and the exhaust port is between the base housing and the plate.

8. The backpack dust collector according to claim 7, wherein
the base housing includes a recessed portion that is recessed rearward,
the plate covers an opening of the recessed portion,
the flow path is between an inner surface of the recessed portion and a rear surface of the plate, and
the noise-absorbing member is fixed to the inner surface of the recessed portion and the rear surface of the plate.

9. The backpack dust collector according to claim 8, wherein the housing is configured such that, when the backpack dust collector is carried on the back of the user, the plate faces the back.

10. The backpack dust collector according to claim 8, wherein
the at least two slit-shaped vents are in the base housing, and
the noise-absorbing member faces the at least two slit-shaped vents.

11. The backpack dust collector according to claim 8, wherein
the flow path extends in the up-and-down direction of the backpack dust collector, and
the exhaust port is defined by a lower end portion of the inner surface of the recessed portion and a lower end portion of the rear surface of the plate.

12. The backpack dust collector according to claim 7, wherein the slit portion is in the base housing.

13. The backpack dust collector according to claim 12, wherein the housing is configured such that, when the backpack dust collector is carried on the back of the user, the plate faces the back, the vent faces laterally, and the exhaust port faces downward.

14. The backpack dust collector according to claim 7, wherein the slit portion is provided to a slit member that is attachable to and detachable from the base housing.

15. The backpack dust collector according to claim 1, wherein the noise-absorbing member includes a porous member.

16. The backpack dust collector according to claim 15, wherein the noise-absorbing member includes an open-cell porous member.

17. The backpack dust collector according to claim 1, further comprising a damper around the motor case and configured to absorb noise generated by the motor.

18. The backpack dust collector according to claim 1, wherein the fan is not encased by the motor case.

* * * * *